United States Patent
Kozma et al.

(10) Patent No.: US 12,542,351 B2
(45) Date of Patent: Feb. 3, 2026

(54) AUTOMATED AoX TEST SYSTEM

(71) Applicant: Silicon Laboratories Inc., Austin, TX (US)

(72) Inventors: David Kozma, Budapest (HU); Attila Zolomy, Budapest (HU); Szabolcs Lorincz, Vamosmikola (HU); János Márkus, Vecsés (HU)

(73) Assignee: Silicon Laboratories Inc., Austin, TX (US)

( * ) Notice: Subject to any disclaimer, the term of this patent is extended or adjusted under 35 U.S.C. 154(b) by 361 days.

(21) Appl. No.: 18/372,936

(22) Filed: Sep. 26, 2023

(65) Prior Publication Data

US 2025/0102612 A1   Mar. 27, 2025

(51) Int. Cl.
*H01Q 3/26* (2006.01)
*G01S 3/02* (2006.01)
*G01S 5/02* (2010.01)

(52) U.S. Cl.
CPC ............ *H01Q 3/267* (2013.01); *G01S 3/023* (2013.01); *G01S 5/021* (2013.01)

(58) Field of Classification Search
CPC .......... H01Q 3/267; G01S 3/023; G01S 5/021
See application file for complete search history.

(56) References Cited

U.S. PATENT DOCUMENTS

| | | | | |
|---|---|---|---|---|
| 4,453,164 A | * | 6/1984 | Patton | H01Q 3/267 342/372 |
| 11,611,152 B2 | | 3/2023 | Zolomy et al. | |
| 2015/0188647 A1 | * | 7/2015 | Wang | H01Q 3/267 455/67.12 |
| 2019/0219706 A1 | * | 7/2019 | Wang | H01Q 3/267 |
| 2021/0050923 A1 | * | 2/2021 | Chang | H01P 3/082 |
| 2022/0416439 A1 | | 12/2022 | Zolomy et al. | |
| 2022/0416440 A1 | | 12/2022 | Sule et al. | |
| 2022/0416445 A1 | | 12/2022 | Dickey et al. | |

FOREIGN PATENT DOCUMENTS

| | | | | |
|---|---|---|---|---|
| CN | 216595320 U | | 5/2022 | |
| CN | 115275608 A | * | 11/2022 | .......... H01Q 3/2676 |
| DE | 29623877 U1 | * | 6/2000 | .......... G01S 7/4026 |

* cited by examiner

*Primary Examiner* — Robert W Hodge
*Assistant Examiner* — Fred H Mull
(74) *Attorney, Agent, or Firm* — Nields, Lemack & Frame, LLC

(57) ABSTRACT

A system and method for characterizing the performance of an antenna array in a locator device is disclosed. The system comprises a chamber having a locator device and a beacon device. The beacon device is disposed on a rail so as to move in a predictable path while emitting the direction detecting signal. A controller is used to move the beacon device and record its actual position. Phase or direction information collected from the locator device is then supplied to the controller. The controller then compares the actual position to the information received from the locator device and provides this comparison to the user. The path of the rail may allow elevation angles from 0° to 90°. Further, the locator device may rotate, allowing azimuth angles from 0° to at least 180°.

19 Claims, 6 Drawing Sheets

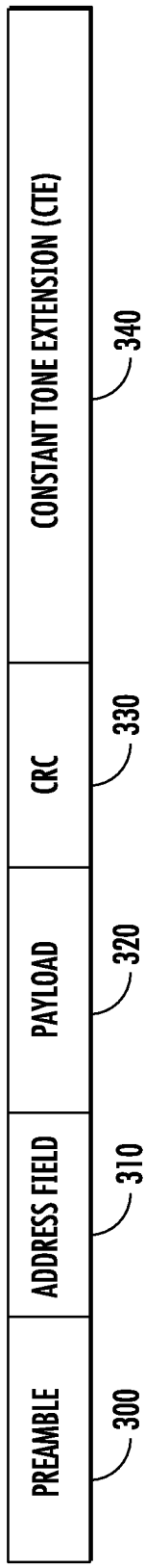
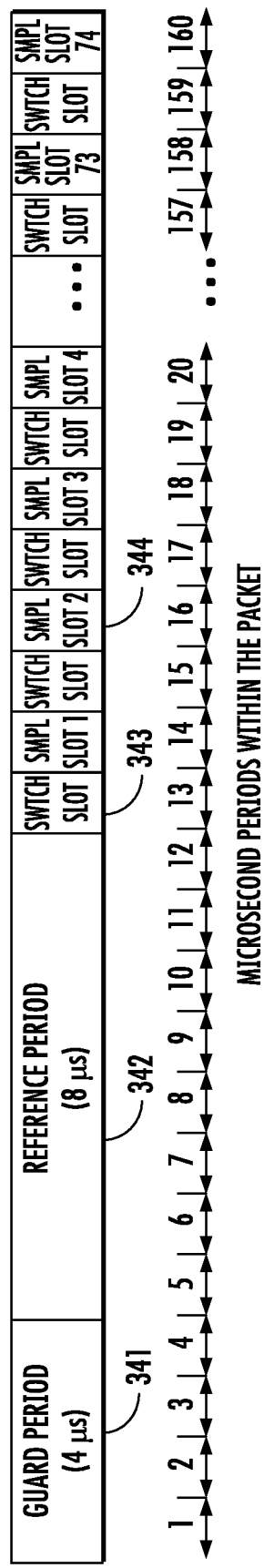
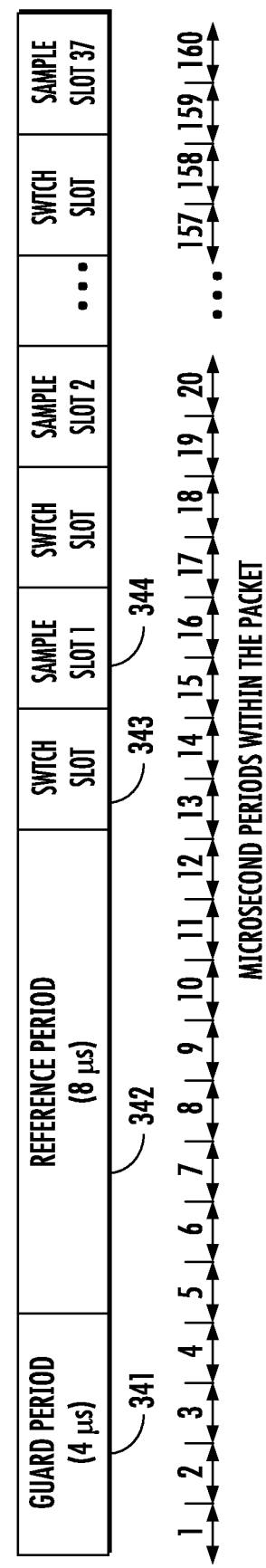
FIG. 3A
FIG. 3B
FIG. 3C

AUTOMATED AoX TEST SYSTEM

This disclosure describes systems and methods for performing AoX testing and validation of a locator device.

BACKGROUND

Angle of Arrival and Angle of Departure algorithms, collectively referred to as AoX algorithms, typically operate by determining a phase difference between different antenna elements in an antenna array. This phase difference can be used to determine the angle from which the signal originated, since the distance between antenna elements is known.

Specifically, assume the distance between two adjacent antenna elements is d. The phase difference between when the incoming signal is detected at these two adjacent antennas can be given as $\varphi$. This phase difference, $\varphi$, divided by $2\pi$, multiplied by the wavelength, $\lambda$, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

One algorithm that is commonly used to determine AoX is referred to as MUSIC. This algorithm generates pseudospectrums from the incoming data and estimates the most likely AoX from these pseudospectrums. In some instances, the reception of the antenna array may not be symmetric. Rather, the signal received from certain directions may vary in amplitude from a similar powered signal from another direction. In some instances, this may be compensated for in the AoX algorithm. However, understanding the characteristics of the antenna array is not trivial, as the actual performance may differ from simulated performance.

One approach is to utilize an anechoic chamber in which the device with the antenna array, also referred to as the locator device, and a device emitting a direction detecting signal, also referred to as a beacon device, are disposed. The relative position of the locator device and the beacon device may be varied to attempt to better characterize the performance of the antenna array. However, this process may be highly manual and very time consuming.

Therefore, it would be beneficial if there were a system and method of determining the performance of an antenna array within a locator device in an automated fashion.

SUMMARY

A system and method for characterizing the performance of an antenna array in a locator device is disclosed. The system comprises a chamber having a locator device and a beacon device. The beacon device is disposed on a rail so as to move in a predictable path while emitting the direction detecting signal. A controller is used to move the beacon device and record its actual position. Phase or direction information collected from the locator device is then supplied to the controller. The controller then compares the actual position to the information received from the locator device and provides this comparison to the user. The path of the rail may allow elevation angles from 0° to 90°. Further, the locator device may rotate, allowing azimuth angles from 0° to at least 180° to be measured.

According to one embodiment, test system a for characterization of an antenna array in a locator device is disclosed. The test system comprises a rotating motor, capable of a rotation of at least 180°, to which the locator device is adapted to be affixed; a beacon device, wherein the beacon device is configured to emit a direction detecting signal; a rail on which the beacon device is disposed, wherein the rail is a portion of a circle; a motor to move the beacon device along the rail; and a controller in communication with the rotating motor, the motor and the locator device. In some embodiments, the beacon device remains a constant distance from the locator device as it travels along a path of the rail. In some embodiments, the controller is configured to move the beacon device to a position on the rail using the motor, and rotate the locator device using the rotating motor, and cause the locator device to capture a plurality of I and Q values associated with a plurality of azimuth angles at each elevation angle. In some embodiments, the beacon device is configured to emit the direction detecting signal using more than one polarization, and the controller is configured to cause the locator device to capture the plurality of I and Q values associated with the plurality of azimuth angles at each elevation angle and each polarization. In some embodiments, the motor provides an indication of the position of the beacon device on the rail and the rotating motor provides an indication of an amount of rotation, and the controller determines an actual position and rotation based on information from the motor and the rotating motor. In certain embodiments, an angle of arrival is calculated for each elevation angle and each azimuth angle using the I and Q signals captured by the locator device at a respective elevation angle and azimuth angle. In certain embodiments, the controller compares the actual position and rotation to a calculated angle of arrival and generates a deviation for an azimuth angle at a given elevation angle. In certain embodiments, the controller provides a graph, chart or table showing the deviation for each azimuth angle at the given elevation angle. In some embodiments, the rail comprises at least one quarter of the circle.

According to another embodiment, a method of automated characterization of an antenna array is disclosed. The method comprises disposing a locator device comprising the antenna array at a first azimuth angle; disposing a beacon device on a rail, wherein each position on the rail represents a different elevation angle; emitting a direction detecting signal from the beacon device at a first position, corresponding to a first elevation angle; collecting I and Q signals at the locator device while the beacon device is at the first position; rotating the locator device to a second azimuth angle; and repeating the emitting, collecting and rotating until all desired azimuth angles are tested. In some embodiments, the method comprises moving the beacon device to a second position on the rail, corresponding to a second elevation angle; and repeating the emitting, collecting, and rotating until all desired azimuth angles are tested. In some embodiments, the beacon device remains a constant distance away from the locator device at each different elevation angle. In certain embodiments, the rail is a portion of a circle and the locator device is disposed at a center of the circle. In some embodiments, the beacon device is moved to the second position using a motor. In some embodiments, the method comprises calculating an angle of arrival based on the I and Q signals for each tested azimuth angle; and comparing each calculated angle of arrival to the first elevation angle and each tested azimuth angle. In certain embodiments, the method comprises computing a deviation between the angle of arrival and each tested azimuth angle. In certain embodiments, the method comprises providing a graph, chart or table showing the deviation. In some embodiments, the method comprises changing a polarization of the direction detecting signal emitted from the beacon device; and repeating the emitting, collecting, and rotating until all desired azimuth angles are tested. In some embodiments, the locator device is rotated to the second azimuth angle using a rotating motor.

BRIEF DESCRIPTION OF THE DRAWINGS

For a better understanding of the present disclosure, reference is made to the accompanying drawings, in which like elements are referenced with like numerals, and in which:

FIGS. 3A-3C show the format of a representative direction detection message transmitted to the system of FIG. 1;

DETAILED DESCRIPTION

As noted above, in certain embodiments, it may be beneficial to characterize or validate the performance of an antenna array in a locator device.

Figure 1:
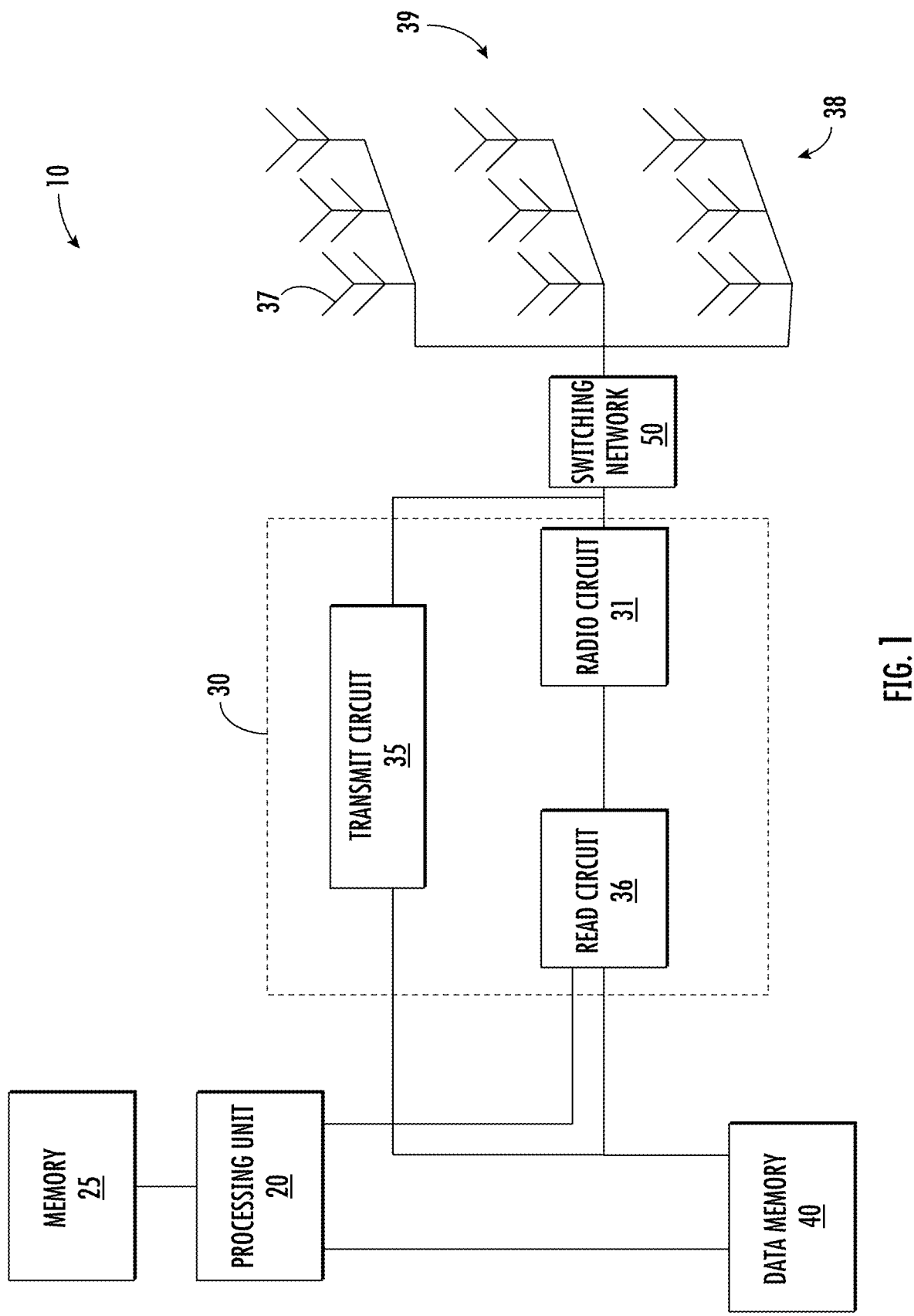
FIG. 1 is a block diagram of a network device that may be used in the test system described herein.

FIG. 1 shows a locator device with an antenna array that may require characterization or validation. The locator device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the locator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The locator device 10 also includes a network interface 30, which may be a wireless network interface that includes an antenna array 38. The network interface 30 may support any wireless network protocol that supports AoX determination, such as Bluetooth. The network interface 30 is used to allow the locator device 10 to communicate with other devices disposed on the network 39.

The network interface 30 is in communication with the antenna array 38, which comprises a plurality of antenna elements 37. A switching network 50 may be used to select which of the plurality of antenna elements 37 is in communication with the network interface 30.

The network interface 30 includes radio circuit 31. This radio circuit 31 is used to process the incoming signal and convert the wireless signals to digital signals. The components within the radio circuit 31 are described in more detail below.

The network interface 30 also includes a read circuit 36. The read circuit 36 is used to receive, synchronize and decode the digital signals received from the radio circuit 31. Specifically, the read circuit 36 has a preamble detector that is used to identify the start of an incoming packet. The read circuit 36 also has a sync detector, which is used to identify a particular sequence of bits that are referred to as a sync pattern. Additionally, the read circuit 36 has a decoder which is used to convert the digital signals into properly aligned bytes of data.

The network interface 30 also includes a transmit circuit 35. The transmit circuit 35 may include a power amplifier that is used to supply a signal to be transmitted to the antenna array 38.

The locator device 10 may include a data memory device 40. Data that is received from the network interface 30 or is to be sent via the network interface 30 may also be stored in the data memory device 40. This data memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the locator device 10. The instructions contained on this second computer readable non-transitory media may be downloaded onto the memory device 25 to allow execution of the instructions by the locator device 10.

While the processing unit 20, the memory device 25, the network interface 30 and the data memory device 40 are shown in FIG. 1 as separate components, it is understood that some or all of these components may be integrated into a single electronic component. Rather, FIG. 1 is used to illustrate the functionality of the locator device 10, not its physical configuration.

Although not shown, the locator device 10 also has a power supply, which may be a battery or a connection to a permanent power source, such as a wall outlet.

Figure 2:
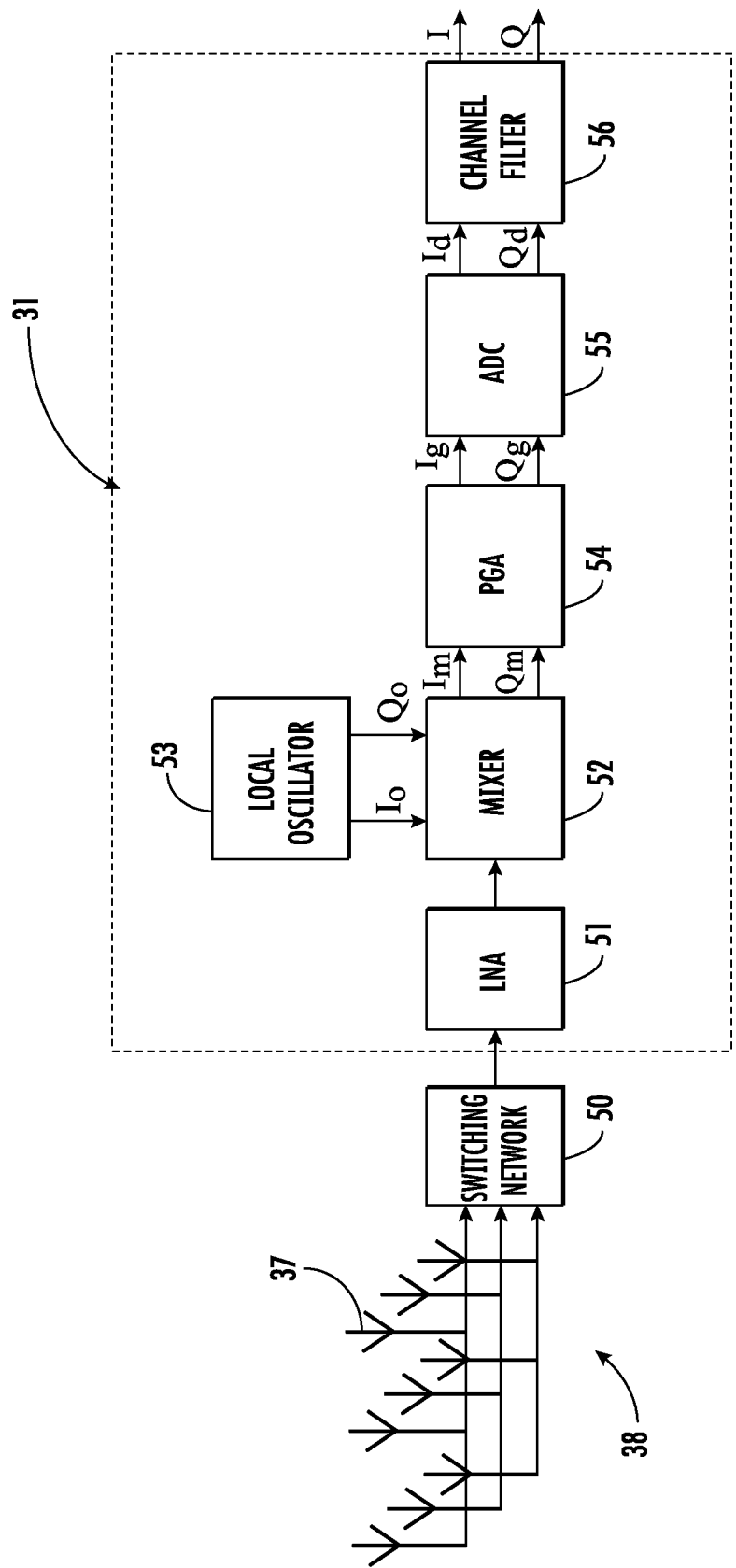
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. A switching network 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 and then exit the radio circuit 31 as I and Q. In certain embodiments, the I and Q values may be considered complex numbers, wherein the I value is the real component and the Q value is the imaginary component.

The I and Q signals may then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"'s. The CTE 340 may be as long as 160 μsec and as short as 16 μsec. In practice, the locator device 10 may use a single antenna element 37 of the antenna array 38 to receive the CTE 340 during the guard period 341 and the reference period 342. The device utilizes the signal received during the guard period 341 and the reference period 342 to set the gain (AGC) and frequency (AFC) of the radio circuit 31.

The locator device 10 then switches to another antenna element 37 during each switch slot 343 by changing the selection of the switching network 50 in the radio circuit 31. The locator device 10 samples the tone again with that new antenna element 37 during the sample slot 344. The locator device 10 continues switching the antenna element 37 during each switch slot 343 and sampling the tone during the sample slot 344. If there are more switch slots 343 than antenna elements, the locator device 10 may return to the first antenna element 37 and repeat the sequence.

During the entirety of the CTE 340, the sending device, also referred to as a beacon device, is transmitting a tone at a constant known frequency. As stated above, the locator device 10 may receive the guard period 341 and the reference period 342, which have a combined duration of 12 μsec, using one antenna element 37 of the antenna array.

Figure 4:
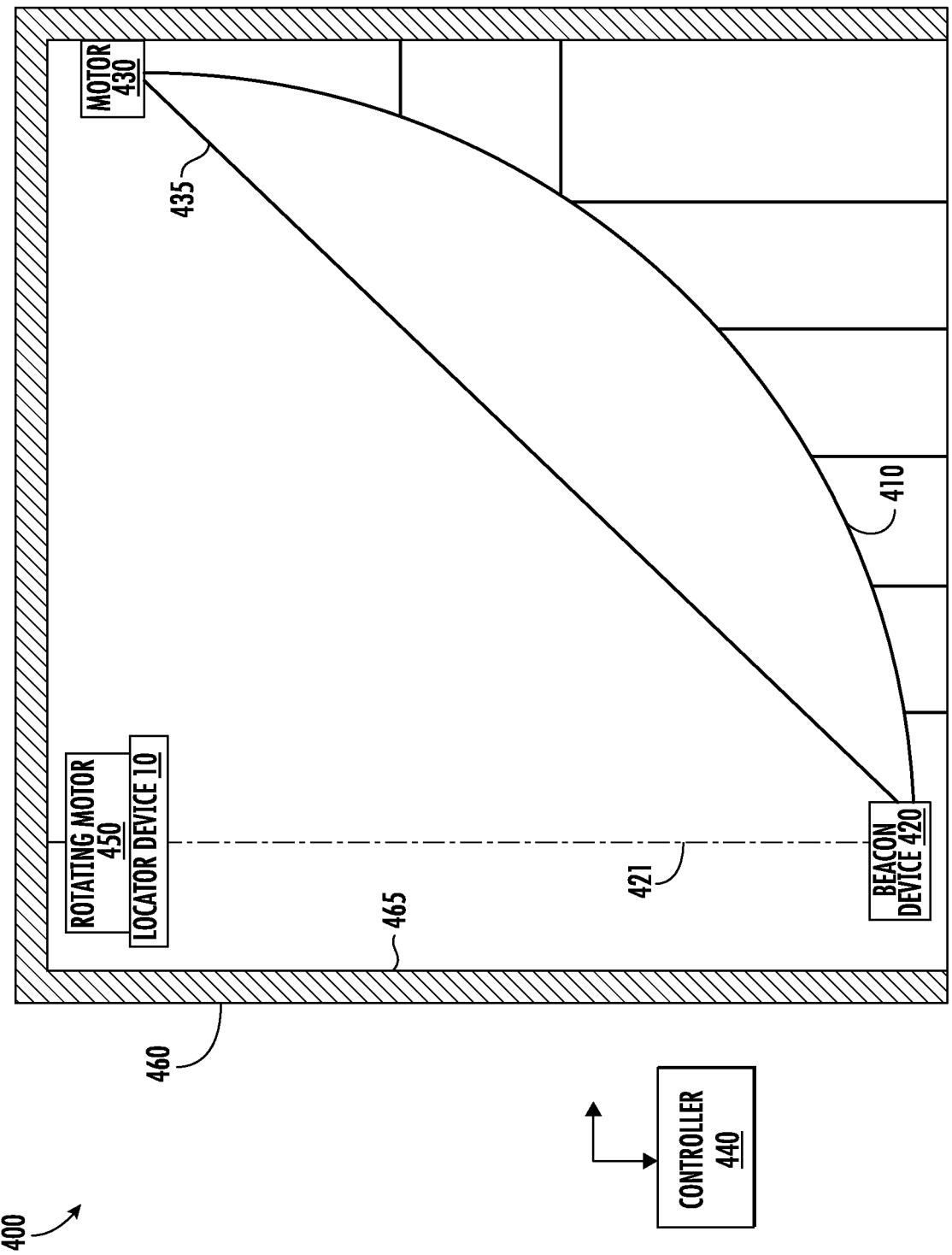
FIG. 4 shows the test system according to one embodiment.

FIG. 4 shows a test system 400 that may be used to characterize or validate the performance of the antenna array in the locator device 10. The test system 400 includes a rail 410, on which a beacon device 420 is attached.

The beacon device 420 may have an architecture similar to that shown in FIG. 1. However, the beacon device 420 may have only a single antenna element rather than an antenna array. However, the beacon device 420 may be able to transmit using different polarizations, such as horizontal, vertical and/or circular. Therefore, the switching network 50 shown in FIG. 1 may only be utilized in the beacon device 420 to change the polarization of the antenna element. Further, the processing unit 20 of the beacon device 420 may be less powerful than that in the locator device 10. Further, the beacon device 420 may be battery powered in some embodiments.

The rail 410 may be constructed of a material that minimizes reflections of electromagnetic waves. For example, the rail 410 may be constructed of wood, or certain plastics, such as polylactic acid (PLA), polytetrafluoroethylene (PTFE) or polyethylene, although other materials may be used. Further, in certain embodiments, the rail 410 may form a portion of a circular path. For example, the rail may be a quarter of a circle in some embodiments. In other embodiments, the rail 410 may form a larger or smaller portion of the circle. For example, the rail 410 may form a semicircle in certain embodiments. Further, the locator device 10 may be disposed at the center of this circle. The shape of the rail 410 has several purposes. First, by placing the locator device 10 at the center of the circle, the locator device 10 is always the same distance away from the beacon device 420. In this way, the strength of the signal received by the locator device 10 is constant during the testing. Second, by utilizing a circular path, the orientation of the beacon device 420 relative to the locator device 10 never changes. For example, if the top of the beacon device 420 is a flat surface, that flat surface will always be perpendicular to a line 421 connecting the center of the beacon device 420 and the locator device 10.

The beacon device 420 may be coupled to a motor 430 that moves the beacon device 420 along the rail 410. For example, a rope, chain or other coupling device 435 may be used to couple the motor 430 to the beacon device 420. In some embodiments, the motor 430 is disposed on an interior wall of the chamber 460 so that the motor 430 does not interfere with the electromagnetic field generated by the beacon device 420. In another embodiment, the motor 430 may be located outside the chamber 460. In another embodiment, the beacon device 420 may be disposed on the motor 430, which travels along the rail 410 without the use of a coupling device 435.

In each embodiment, this motor 430 may be a stepper motor, wherein each step of the motor is a predetermined distance along the arc. In another embodiment, a linear motor may be used. In this embodiment, an encoder may be used to measure the distance that the beacon device 420 has moved along the rail 410. Thus, in all embodiments, the motor 430 includes an indication of the distance that the beacon device 420 has been moved along the rail 410. The motor 430 is in communication with a controller 440, which provides instructions to the motor 430 to move, and also receives the indication of distance from the motor 430.

FIG. 4 shows the beacon device 420 at its lowest elevation. As the motor 430 is actuated, the coupling device 435 draws the beacon device 420 toward the motor 430, causing the beacon device 420 to move along the rail 410. The beacon device 420 may be drawn toward the motor 430 such that the range of elevation angles may be 45° or more. In some embodiments, the range of elevation angles may be 90° or more. In this scenario, the beacon device 420 may move from a position where it is directly below the locator device 10 (as shown in FIG. 4) to a position where it is at the same height as the locator device 10. Note that the rotation of the locator device 10 is about a first axis, which may be vertical. In contrast, the movement of the beacon device 420 along the rail 410 is about a second axis, which is perpendicular to the first axis and may be horizontal. This configuration allow both azimuth and elevation angles to be modified by the rotation of the locator device 10 and the movement of the beacon device 420, respectively.

Note that, while FIG. 4 shows the locator device attached to the top surface of the chamber 460, other configurations are possible. For example, the locator device 10 may be attached to the bottom surface of the chamber 460. In this configuration, the rail 410 may extend from a position directly above the locator device 10 to a position that is at the same height as the locator device 10. Also note that the locator device 10 may be attached to a wall of the chamber 460. If the locator device 10 is attached to the left wall (see FIG. 4), the rail 410 may remain in the position shown in that figure.

As noted above, the locator device 10 may be located at the center of the circle that defines the path of the rail 410. Thus, the locator device 10 may be disposed directly above the rail 410. Additionally, the locator device 10 is attached to a rotating motor 450. This rotating motor 450 may be capable of at least 180° of rotation. In other embodiments, it is capable of 360° of rotation. In certain embodiments, the rotating motor 450 may be a stepper motor, wherein each step is a predefined angular distance. In another embodiment, the rotating motor 450 may include an encoder that is capable of determining the angular position of the locator device 10.

The rotating motor 450 is in communication with the controller 440, which provides instructions to the rotating motor 450 to move, and also receives an indication of the amount of rotation from the rotating motor 450.

The rail 410, the beacon device 420, the motor 430, the locator device 10 and the rotating motor 450 may all be disposed within a chamber 460. The chamber 460 may have dimensions such that the distance between the locator device 10 and the beacon device 420 is at least 3 wavelengths, such that the measurements are made in the far field of the antenna. In some embodiments, the chamber 460 is at least a 1 meter cube. Further, in some embodiments, electromagnetic shielding 465 is disposed on the interior walls of the chamber 460 to reduce reflections and minimize stray fields emitting from outside the chamber 460.

Having described the configuration of the test system 400, its operation will now be described. First, the beacon device 420 is installed on the rail 410. In certain embodiments, the beacon device 420 may be disposed at one of the ends of the rail 410 at the start of the measurements. As an example, the beacon device 420 may be set at the highest point or the lowest point along the rail 410. The position of the beacon device 420 on the rail 410 determines the elevation angle. Additionally, the locator device 10 is at an initial rotational angle. Note that the rotational angle determines the azimuth angle. If stepper motors are used, the controller 440 may be aware of the starting position. In other embodiments, the controller 440 may receive data from one or more encoders that allow it to determine the position of the beacon device 420 and the rotational angle of the locator device 10.

Figure 5:
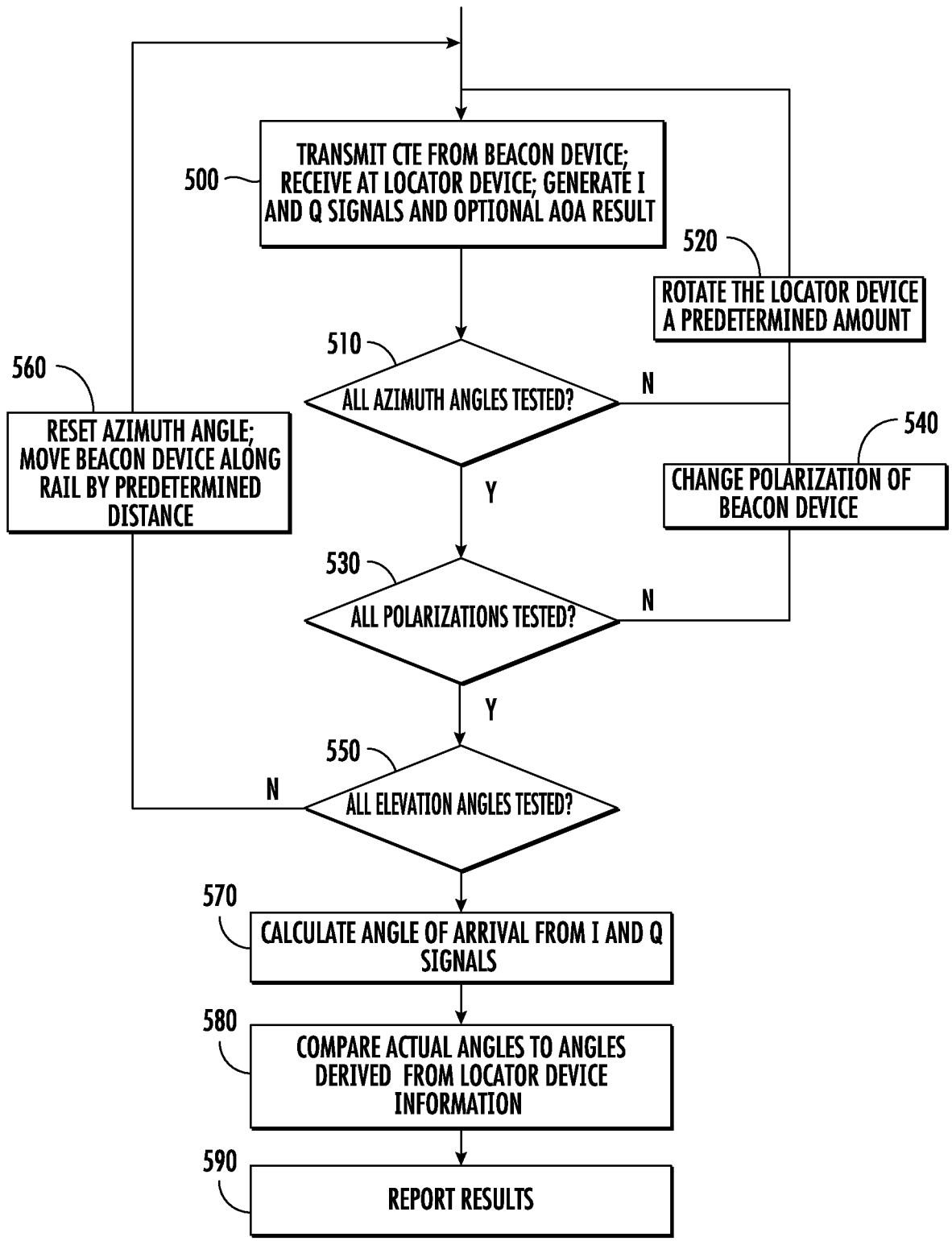
FIG. 5 shows a flow chart showing the operation of the test system.

Then, as shown in Box 500 of FIG. 5, the beacon device 420 emits the direction detecting signal, which may include a CTE 340. The locator device 10 receives this signal and switches between the antenna elements 37 in the antenna array 38 as the signal is being received. In this way, the locator device 10 may generate I and Q signals for each antenna element 37 while the beacon device 420 is at the initial position on the rail 410 and locator device 10 is at the initial rotational angle. These I and Q values may be stored in the memory device of the locator device 10. Alternatively or additionally, they may be relayed to the controller 440 at this time. Further, in certain embodiments, the locator device 10 may have sufficient processing power and memory capacity that it is configured to determine the angle of arrival (AoA) based on these I and Q values. For example, the locator device 10 may utilize a MUSIC algorithm to determine the angle of arrival. Of course, other algorithms, such as for example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the angle of arrival. Therefore, throughout this disclosure, any algorithm that accepts signals from a plurality of antenna elements as inputs and based on that, determines an Angle of Arrival, may be referred to as an AoA algorithm.

Next, as shown in Decision Box 510, the controller 440 determines whether all azimuth angles have been tested. In some embodiments, the range of azimuth angles is from 0° to 360°. In other embodiments, the range of azimuth angles may be smaller, such as 0° to 180°. If all azimuth angles have not been tested, the controller 440 instructs the rotating motor 450 to rotate the locator device 10 by a predetermined amount, as shown in Box 520. This predetermined amount may be implementation specific, and may be 1°, 3°, 5°, 10° or any other suitable amount. In some embodiments, the controller 440 may receive an indication of the new rotational angle, such as from an encoder.

Once the locator device 10 has been rotated to the new azimuth angle, the process described above with respect to Box 500 is repeated, such that a direction detecting signal with a CTE 340 is again transmitted from the beacon device 420, and additional I and Q values are calculated for each antenna element 37.

The sequence shown in Boxes 500 and 520 is repeated until all of the desired azimuth angles have been tested. Thus, when the controller executes Decision Box 530 for the first time, all of the desired azimuth angles for a first elevation angle have been tested. Next, as shown in Decision Box 530, the controller 440 checks if all of the desired polarizations have been tested. As noted above, in some embodiments, the beacon device 420 may be capable of transmitting signals using different polarizations. If the beacon device 420 is capable of different polarizations, the polarization may be changed, as shown in Box 540. The sequence shown in Boxes 500-520 is repeated again. Once all polarizations have been tested, the controller 440 then checks if all elevation angles have been tested, as shown in Decision Box 550. If not, the controller 440 instructs the motor 430 to move the beacon device 420 a predetermined distance along the rail 410, as shown in Box 560. This distance may be equated to an angular change in the elevation direction. For example, if the length of line 421 is R, then a distance of $2\pi R/360$ is equal to an angular change of 1° in elevation. In some embodiments, the distance that the motor 430 moves is predetermined, such as through the use of a stepper motor. In other embodiments, the controller 440 may determine the actual position of the beacon device 420 through information provided by an encoder. In some embodiments, the distance may correspond to 1°, 2°, 5° or another suitable amount. Once the beacon device 420 has moved to the new position along the rail 410, the sequence shown in Boxes 500 and 520 is repeated for all desired azimuth angles.

The controller 440 then moves the beacon device 420 again to a new position on the rail 410 and repeats this sequence. This continues until all desired elevation angles have been tested, as determined in Decision Box 550. In certain embodiments, the range of elevation angles may be from 0° to 90° or from 0° to 180°.

Next, if the locator device 10 has not already done so, the information collected by the locator device 10 is transmitted to the controller 440. In certain embodiments, the information collected by the locator device 10 includes I and Q values for each azimuth angle at each elevation angle. In this scenario, as shown in Box 570, the controller 440 calculates the angle of arrival for each set of I and Q values for each azimuth angle at each elevation angle. This may be done using any of the AoA algorithms described above.

The controller 440 then compares the calculated angle of arrival with the actual position of the beacon device 420 and rotational angle of the locator device 10, as shown in Box 580. For example, the controller 440 may calculate, using an AoA algorithm, that the angle of arrival at a particular point was 50° elevation angle and 53° azimuth angle. The controller 440 then compares this to the actual position of the beacon device 420 and rotational angle of the locator device 10. Based on this, the controller 440 may report the results, as shown in Box 590. In one embodiment, the controller 440 may generate a chart, graph or table showing the accuracy of the locator device 10.

Note that the sequence shown in FIG. 5 may be modified. For example, in another embodiment, the controller 440 may receive the I and Q values from the locator device 10 after each measurement (i.e., after Box 500). The controller 440 may then use these I and Q values to determine a measured elevation and azimuth angle. This may be immediately compared to the actual elevation and azimuth angle. In other words, Boxes 570 and 580 may be executed after each measurement is taken, rather than being executed after all measurements are made.

Further, Decision Boxes 510 and 530, and their associated actions may be reversed such that all polarizations are performed at each azimuth angle before the locator device 10 is rotated. Additionally, the changing of the elevation angle may be performed prior to changing the polarization and/or the azimuth angle.

Figure 6:
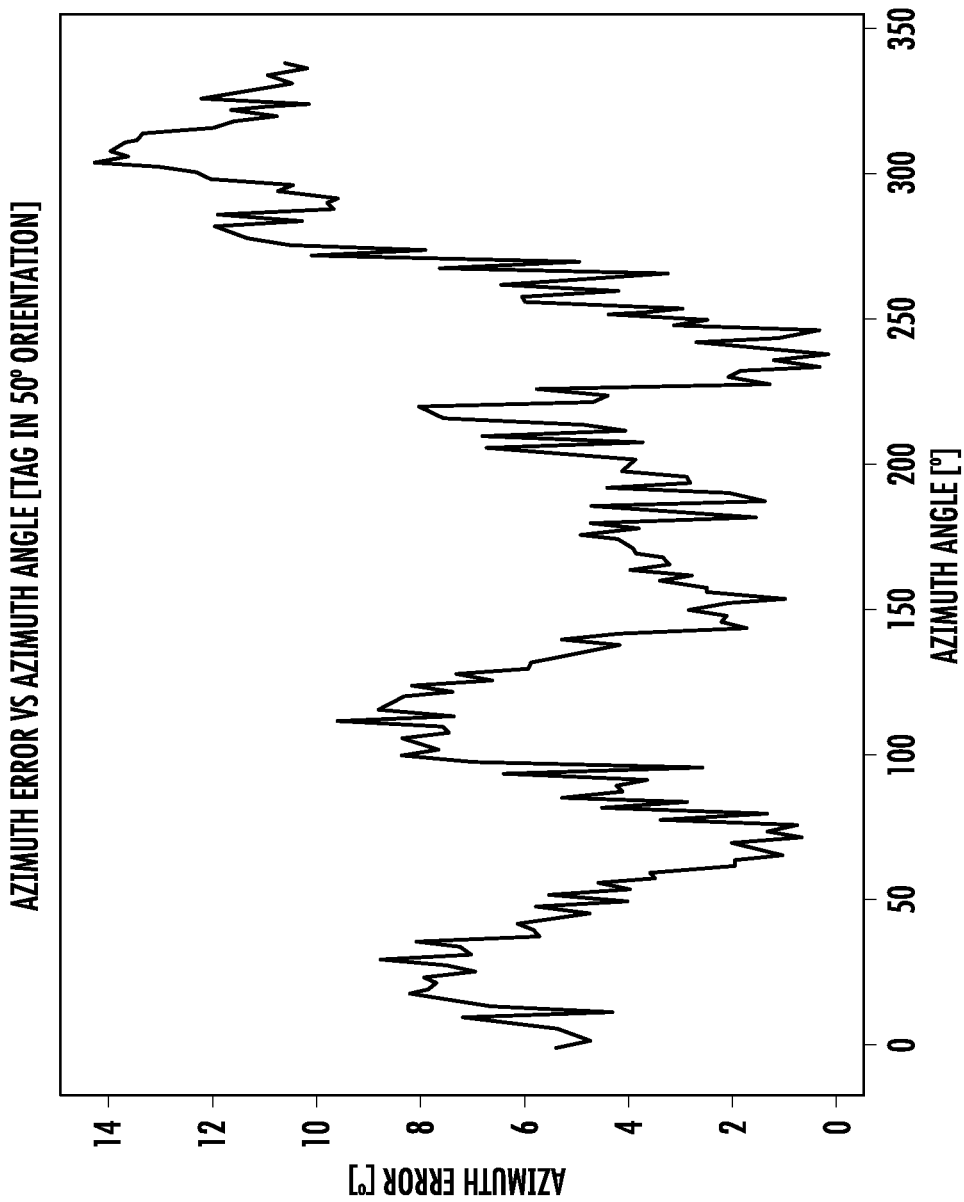
FIG. 6 shows one possible output from the test system.

FIG. 6 shows an example of this comparison where the actual azimuth angle is plotted on the horizontal axis and the deviation from the actual azimuth angle (referred to as azimuth error) is plotted on the vertical axis. Alternatively, the controller may provide a table showing the azimuth error for each tested azimuth angle. Alternatively or additionally, the controller 440 may provide a report showing the I and Q values collected at one or more positions.

This test system may have many purposes. First, it may be used to characterize the performance of an antenna array. This may be useful in determining how to compensate for any non-uniformity within the AoA algorithm. Second, this test system may be used to validate new revisions of a product or new revisions of firmware that are executed on an existing product. For example after a new firmware revision is installed on an existing locator device, the locator device 10 may be tested using the test system. These new test results may be compared to test data from a previous revision of the locator device 10 to confirm that the firmware update did not adversely affect the functionality of the antenna array and generation of the I and Q signals. Third, this test system may be used for validation or characterization of customer products. For example, a customer may purchase a printed circuit board that includes an antenna array from a vendor, and then install this printed circuit board into a proprietary enclosure with other electronics. The enclosure and other electronics may affect the performance of the antenna array in unexpected ways. By being able to perform this automated testing, the impact in performance can be determined quickly.

The present system and method has many advantages. In contrast to prior art systems, the present test system allows automated testing of an antenna array in both angular domains (azimuth and elevation). In certain prior art environments, the process for obtaining measurement data for a full range of azimuth and elevation angles may take more than one day, due to the manual intervention required. The present test system may complete in process in only a few hours. Further, the test system is configured such that the distance between the locator device 10 being tested and the beacon device 420 that emits the directed detection signal is constant. Additionally, through use of encoders and/or stepper motors, the controller 440 may determine an exact position of the beacon device 420 and rotational angle of the locator device 10, enabling accurate comparisons between actual position and calculated results.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A test system for characterization of an antenna array in a locator device, comprising:
   a rotating motor, capable of a rotation of at least 180°, to which the locator device is adapted to be affixed;
   a beacon device, wherein the beacon device is configured to emit a direction detecting signal;
   a rail on which the beacon device is disposed, wherein the rail is a portion of a circle;
   a motor to move the beacon device along the rail; and
   a controller in communication with the rotating motor, the motor and the locator device.

2. The test system of claim 1, wherein the beacon device remains a constant distance from the locator device as it travels along a path of the rail.

3. The test system of claim 1, wherein the controller is configured to move the beacon device to a position on the rail using the motor, and rotate the locator device using the rotating motor, and cause the locator device to capture a plurality of I and Q values associated with a plurality of azimuth angles at each elevation angle.

4. The test system of claim 3, wherein the beacon device is configured to emit the direction detecting signal using more than one polarization, and wherein the controller is configured to cause the locator device to capture the plurality of I and Q values associated with the plurality of azimuth angles at each elevation angle and each polarization.

5. The test system of claim 3, wherein the motor provides an indication of the position of the beacon device on the rail and the rotating motor provides an indication of an amount of rotation, wherein the controller determines an actual position and rotation based on information from the motor and the rotating motor.

6. The test system of claim 5, wherein an angle of arrival is calculated for each elevation angle and each azimuth angle using the I and Q signals captured by the locator device at a respective elevation angle and azimuth angle.

7. The test system of claim 6, wherein the controller compares the actual position and rotation to a calculated angle of arrival and generates a deviation for an azimuth angle at a given elevation angle.

8. The test system of claim 7, wherein the controller provides a graph, chart or table showing the deviation for each azimuth angle at the given elevation angle.

9. The test system of claim 1, wherein the rail comprises at least one quarter of the circle.

10. A method of automated characterization of an antenna array, comprising:
    disposing a locator device comprising the antenna array at a first azimuth angle;
    disposing a beacon device on a rail, wherein each position on the rail represents a different elevation angle;
    emitting a direction detecting signal from the beacon device at a first position, corresponding to a first elevation angle;
    collecting I and Q signals at the locator device while the beacon device is at the first position;
    rotating the locator device to a second azimuth angle; and
    repeating the emitting, collecting and rotating until all desired azimuth angles are tested.

11. The method of claim 10, further comprising:
    moving the beacon device to a second position on the rail, corresponding to a second elevation angle; and
    repeating the emitting, collecting, and rotating until all desired azimuth angles are tested.

12. The method of claim 11, wherein the beacon device remains a constant distance away from the locator device at each different elevation angle.

13. The method of claim 12, wherein the rail is a portion of a circle and the locator device is disposed at a center of the circle.

14. The method of claim 11, wherein the beacon device is moved to the second position using a motor.

15. The method of claim 10, further comprising:
    calculating an angle of arrival based on the I and Q signals for each tested azimuth angle; and
    comparing each calculated angle of arrival to the first elevation angle and each tested azimuth angle.

16. The method of claim 15, further comprising computing a deviation between the angle of arrival and each tested azimuth angle.

17. The method of claim 16, further comprising providing a graph, chart or table showing the deviation.

18. The method of claim 10, further comprising:
    changing a polarization of the direction detecting signal emitted from the beacon device; and
    repeating the emitting, collecting, and rotating until all desired azimuth angles are tested.

19. The method of claim 10, wherein the locator device is rotated to the second azimuth angle using a rotating motor.

* * * * *